Walter R. Saks
INVENTOR.

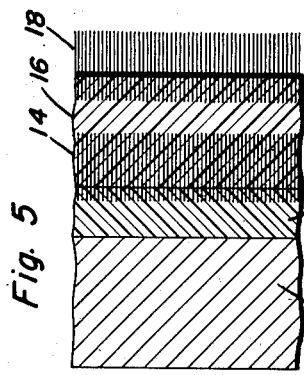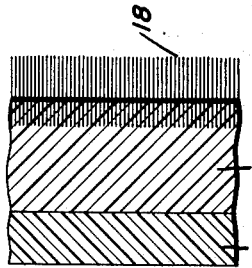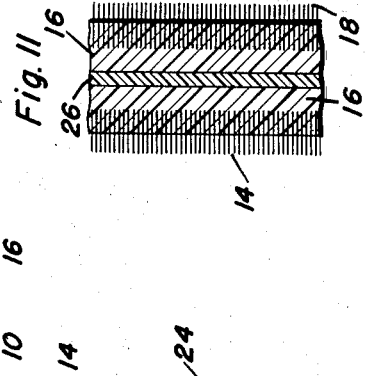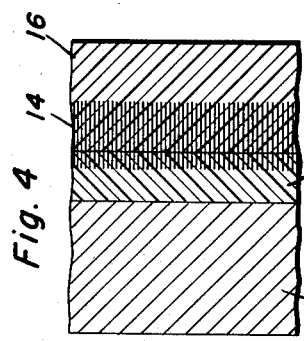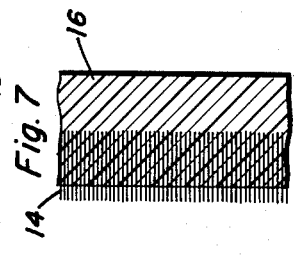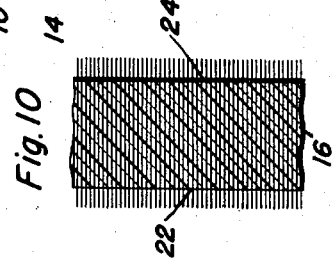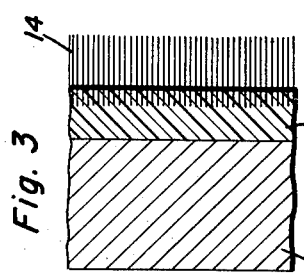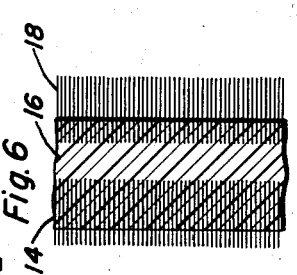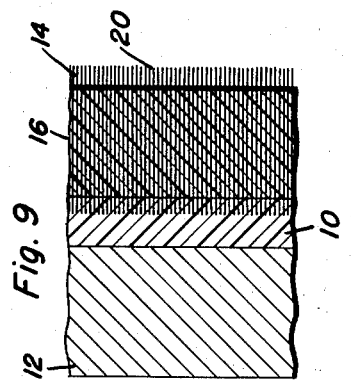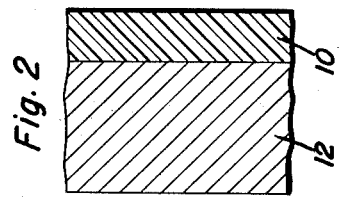
Walter R. Saks
INVENTOR.

Patented Apr. 15, 1952

2,592,602

UNITED STATES PATENT OFFICE 2,592,602

PROCESS OF PRODUCING FLOCKED ARTICLES

Walter R. Saks, Forest Hills, N. Y.

Application September 20, 1950, Serial No. 185,799

22 Claims. (Cl. 154—76)

This is a continuation-in-part of applicant's copending application entitled "Process of Producing Flocked Articles," Serial No. 83,898, filed March 28, 1949, now Patent No. 2,527,501.

In applicant's copending application, a process is disclosed and claimed for making double flocked articles, wherein the flock fibers are sprayed through an electrostatic field upon a charged mold form, then droplets are deposited on the free ends of the flock fibers which form a layer of adhesive, and thereafter further flock is sprayed on the adhesive either in or out of the elastrostatic field. The applicant, after continued experimentation, has found certain marked improvements in the process with regard to the methods of depositing the flock fibers, the use of certain improved adhesives, and the methods of applying the adhesives both to the mold form and to the flock fibers. It has also been found that these improvements provide a greater latitude in the choice of structurally sound adhesives, with the result that the three-dimensional molded articles produced by the improved process are stronger, more durable, more attractive, and capable of wide variation in form, configuration and orientation of the fibers.

An important object of this invention is to provide a process for producing three-dimensional molded articles continuously, economically, and with a minimum of manipulative skill.

As in the copending application, the present process contemplates the production of flocked articles wherein the flock fibers are partially embedded in and protrude from a layer of adhesive which forms the sole structural body of the article. While it is preferred that the flock fibers be oriented substantially perpendicularly to all faces of the adhesive, the process also contemplates the formation of flocked articles wherein the fibers may be oriented at certain desired angles. Because of the nature of the articles produced, it has been found necessary to modify the original process in such a manner that the operator can have a wider latitude of choice of the type of adhesives employed, better control of the orientation of the fibers and better control of the varied lengths of fibers that can be embedded in or protrude from the adhesives. The improved process not only affects the controls mentioned immediately hereinabove but also permits of the production of a very wide variety of three-dimensional articles. Such articles as a glove, a hat, pants, a skirt, a jacket, a coat, a bathing suit, a girdle, and the like may be produced in large quantities and continuously by the method of the present invention.

Another object of this invention is to provide a process of forming on a mold, in one series or a group of connected operations, a finished article made in one piece with no seams, either sewn, welded, sealed, or put together in any other manner. The main structural body of the articles formed is simply an adhesive film of predetermined thickness molded into a desired shape and configuration without any backing material whatever, and having embedded therein and protruding therefrom flock fibers. While, as stated earlier, the fibers should be oriented substantially perpendicularly from the adhesive, for decorative purposes, it may be desirable to orient the fibers at controlled angles of forty to sixty degrees to the adhesive surfaces. Processes of electrostatically depositing flock fibers on a surface at relatively controlled angles are disclosed in the Patents 2,152,077; 2,174,328; and 2,217,126.

As mentioned earlier, it is an important object of this invention to provide a process of producing flocked articles which allows the operator to control and vary the lengths of the fibers embedded in the adhesive as well as the lengths of the fibers protruding from the surfaces of the adhesive. It has been found that when the length and denier of the fibers protruding from the adhesive layer or film is varied, the flocked articles produced have various different characteristics from the point of view of visual and physical contact sensation. While the particular lengths of the fibers are not critical, lengths varying from .015 to .090 inch may be successfully employed with the present process. The protruding lengths of the fibers may be the same for all surfaces of the formed article or may vary from one surface to another, as well as the fact that different protruding lengths of fibers may be associated with a given face or surface of the adhesive. The deniers of the fibers may be varied along with the lengths, and various textures of different kinds of flock fibers may be blended, such as wool and rayon, cotton and nylon, etc.

Another object of this invention is to provide a process of producing a single flocked article, wherein the flock is oriented substantially perpendicularly to the adhesive, wherein the lengths of the fibers embedded in or protruding from the adhesive can be varied, wherein the blend of flock fibers can be varied, and wherein the adhesive acts as the second side of the flocked article, either as the inner or the outer side of the finished article from the standpoint of commercial desirability.

Another important object of this invention is to provide a process of producing a flocked article wherein the structural body of the three-dimensional molded article is fabricated solely of an adhesive and the flock fibers are embedded in and extend entirely through the film or layer of the adhesive with the free ends of the flock fibers protruding substantially perpendicularly from all surfaces of the adhesive.

It has been found, after substantial experimentation, that the adhesive film or layer binding and supporting the flock fibers will, in certain cases, be weak as a result of elongation and flexing. It is therefore another important object of this invention to provide a process wherein the adhesive layer is, in effect, laminated with two outer layers of adhesive secured together by an intermediate layer of adhesive which has a lower coefficient of expansion. In the article produced by this process, the flock fibers are embedded in and protrude at a particular oriented angle from the outer layers of the adhesive.

It is important commercially that certain articles, such as gloves, be fabricated of rubber or latex materials in which the flock fibers are embedded. It is well known in the art that it is difficult to flock rubber goods because the adhesive bond between the rubber or latex and the natural and synthetic fibers is quite poor. It is, therefore, another object of this invention to provide a process of producing flocked articles wherein the structural body of the three-dimensional formed article is formed of rubber or latex which securely binds and supports flock fibers that protrude from the surfaces of the rubber or latex at desired angles of orientation.

The details of the process and the variations thereof will be described in connection with the accompanying drawings wherein:

Figure 2 is an enlarged sectional view of the mold form and primary adhesive and illustrating the first stage in the process;

Figure 3 is an enlarged sectional view of the mold form, primary adhesive and flock fiber and illustrating the second stage of the process;

Figure 4 is an enlarged sectional view of the mold form, primary adhesive, flock fiber, and secondary adhesive and illustrating the third stage in the process;

Figure 5 is an enlarged sectional view of the mold form, primary adhesive, first deposit of flock fibers, secondary adhesive, and second deposit of flock fibers and illustrating the fourth stage of the process;

Figure 6 is an enlarged sectional view of the finished product;

Figure 7 is an enlarged sectional view of another form of the finished product or article;

Figure 8 is an enlarged sectional view of the primary adhesive, secondary adhesive, and flock fibers and illustrating a modified form of the process;

Figure 9 is an enlarged sectional view of the mold form, primary adhesive, flock fibers, and secondary adhesive and illustrating a further modification of the process;

Figure 10 is an enlarged sectional view of the product resulting from the process illustrated in Figure 9; and Figure 11 is an enlarged sectional view of a laminated adhesive supporting flock fibers and illustrating the product resulting from a further modification of the present process.

Figure 1:
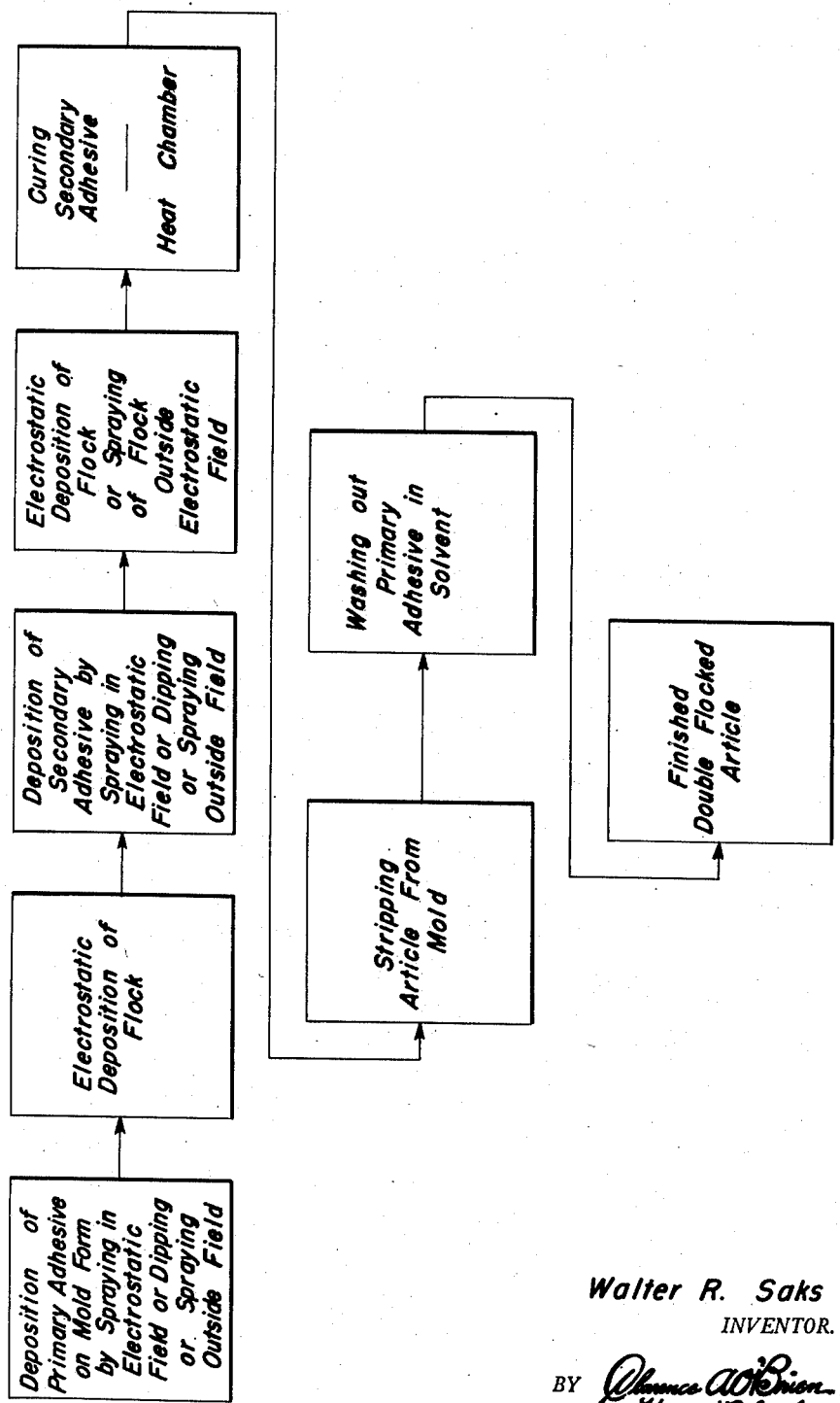
Figure 1 is a flow diagram of the sequential operations of the process.

In describing the present process, reference will be made to the drawings from time to time and similar reference characters will refer to corresponding elements throughout. In carrying out the process, an electrostatic field is produced within a housing or chamber as set forth in applicant's copending application, and a mold form of any desired configuration, shape or dimension is provided which is charged differently from the field and is movable and rotatable on a suitable conveyor through the electrostatic field.

The first stage of the process comprises the deposition of a primary adhesive 10 on the mold form 12 so that a layer or film of predetermined thickness will be produced on the mold form. Such a deposition can be accomplished in several ways as by spraying the primary adhesive in the electrostatic field as the mold form moves therethrough. The deposition can also be effected by dipping the mold form in the primary adhesive or by spraying the primary adhesive outside of the electrostatic field. By controlling the viscosity of the adhesive and the length of time in which the mold form is retained in the adhesive, it will be seen that the dipping process will be an effective method of controlling the thickness of the layer of the primary adhesive on the mold form and also the strength of the adhesive bond. Because of the necessity of controlling the viscosity of the primary adhesive, it is somewhat more difficult, although possible, to control the thickness of the layer of the primary adhesive deposited on the mold form by the spray method. The next stage in the process is the electrostatic deposition of the flock fibers 14 on the primary adhesive. Inasmuch as it is necessary that the fibers be embedded in the primary adhesive and be properly oriented, preferably perpendicularly to the layer of the primary adhesive, the mold form and retained primary adhesive are moved through the electrostatic field. This deposition may be effected by spraying the flock fibers through spray guns which are retained in the electrostatic field and are directed towards the moving mold form. This electrostatic deposition can also be effected by providing a hopper opening into the electrostatic field, which hopper is further provided with a suitable fiber agitating means and a foraminous member for the separation of the fibers as they are fed by gravity through the hopper and are attracted by the charge on the mold form. Inasmuch as the layer of primary adhesive has not completely set or hardened and still remains somewhat pliable, the fibers will not only be oriented but will also become embedded in the primary adhesive. The nature of the primary adhesive as well as its viscosity together with the force employed to spray or deposit the flock fibers will determine the degree or length of penetration of the flock fibers in the primary adhesive. At this stage, the article will take the form shown in Figure 3 of the drawings.

The third stage of the process comprises the deposition of a secondary or different adhesive upon the exposed or free ends of the fibers 14, the secondary adhesive being shown at 16 in the drawings and extending all the way to and in contact with the surface of the primary adhesive 10 through which the fibers 14 protrude, as shown clearly in the drawings. It should be remembered that the secondary adhesive is the one which forms the structural body of the three-dimensional article to be produced by the present process. The physical and chemical differences between the primary and the secondary adhesive will be described hereinafter. The deposition of the secondary adhesive may be accomplished by spraying the same in the electrostatic field. If desired, the mold form can be moved out of the electrostatic field and the secondary adhesive can be sprayed thereon or the mold form with the associated primary adhesive and retained fibers can be dipped in a solution of the secondary adhesive wherein the viscosity and time of contact with the secondary adhesive can be controlled effectively to obtain a desired and predetermined thickness of the secondary adhesive. It will, of course, be understood that the thickness of the secondary adhesive should be controlled, depending upon the nature of the articles to be produced. Note should be taken of the fact that the length of the fibers 14 protruding from the primary adhesive layer 10 determines the length or degree of penetration of these fibers in the secondary adhesive, inasmuch as the secondary adhesive extends to the point of contact with the primary adhesive, as shown clearly in Figure 4. The factors controlling the degree of penetration of the fibers in the primary adhesive have been set forth hereinabove and when these factors are correlated with the lengths of fibers to be employed, it will be seen that a control can be effected for the length or degree of penetration of the fibers 14 in the secondary adhesive layer 16. The lengths of the fibers employed may vary from .015 to .090 inch either in single or in mixed lengths and the fibers themselves may be wool, rayon, cotton, nylon, and the like, or any desired blend thereof. Such blending of the lengths and kinds of fibers can be readily effected either in the spraying mechanism or in the hopper gravity feed described hereinabove.

The fourth stage of the process comprises the electrostatic deposition of flock 18 on the adhesive layer 16. As in the first deposition of the flock, the further flock fibers 18 can be deposited upon the secondary adhesive 16 by spraying the same in the electrostatic field by spray guns or by an agitated gravity feed through a hopper having a foraminous member to separate the fibers. When it is desired that the further flock fibers 18 be oriented relative to the layer of the secondary adhesive, the deposition must take place in the electrostatic field. However, since the fibers 14 have been deposited in the electrostatic field and are properly oriented with regard to the primary adhesive layer 10 and also to one face of the secondary adhesive 16, it is not necessary in all applications that the further flock fibers 18 be oriented relative to the other face of the secondary adhesive in the same manner as the first flock fibers 14 were oriented. Inasmuch as the final product, as shown clearly in Figure 6, will be a predetermined thickness of a layer of secondary adhesive 16 having embedded therein and protruding from all faces thereof the fibers 14 and 18, the three dimensional molded article will have inner and outer faces that are flocked. In most cases, the three-dimensional articles in the form of wearing apparel should have the flock fibers 14 and 18 oriented substantially perpendicularly from the inner and outer faces of the adhesive 16. But there are cases where both the inner and outer surfaces of the article should be flocked but only one of the faces need have oriented fibers. Hence, the further flock 18 may be deposited on the secondary adhesive 16 outside of the electrostatic field.

The fifth stage of the process usually involves the curing and setting of the secondary adhesive while the flocked article is still retained upon the charged mold form. The curing and setting temperatures for the secondary adhesive will, in most cases, be different from the curing and setting temperatures of the primary adhesive because of the chemical differences between these two adhesives, although it is not essential that there be a substantial difference between the setting and curing temperatures of the secondary adhesive and the primary adhesive. Physically, the curing and setting is effected by passing the article on the charged mold form through a suitable heating chamber and then, if necessary, through a suitable cooling chamber. The nature of the curing operation will depend upon the chemical composition of the secondary adhesive and whether the secondary adhesive is either a thermosetting, a thermoplastic, or a mixture of thermosetting and thermoplastic plastics.

The sixth stage of the process includes stripping the article from the charged mold by removing the electrical potential on the mold and physically lifting off the flocked article from the uncharged mold form. In some applications, it is possible to discharge the mold form and strip the flocked article from the mold form before the secondary adhesive is completely cured and set.

The last stage of the process comprises the removal of the primary adhesive layer 10 to expose a predetermined length of the ends of the fibers 14, as shown clearly in Figure 6. The methods of removing the primary adhesive from the fibers 14 and the secondary adhesive 16 without affecting the bonding support of the fibers 14 and 18 in the secondary adhesive 16 depends upon the chemical nature of the primary adhesive employed. Such removal may be effected by mechanical stripping where the primary adhesive is of a strip coat formulation, or, the primary adhesive may be removed by washing in hot or cold water or washing in a hot or cold non-aqueous solvent, it being understood that the hot or cold water and the hot or cold solvents will have substantially no solubilizing effect on the secondary adhesive.

What has been described hereinabove constitutes the basic process of the present invention for producing double flocked articles. Several important variations of this basic process can be effected and will be described immediately hereinafter.

If it is desired to produce a single flocked article in which the flock fibers are embedded in an adhesive and protrude in an oriented relationship through but one face or surface of the adhesive, as shown clearly in Figure 7, the above-described process can be carried out without the steps of depositing the further flock 18 on the secondary adhesive. In this case, therefore, at the stage three of the process, the secondary adhesive may be cured and set, the mold form discharged and the flocked article stripped from the mold form, and then the primary adhesive is appropriately removed to expose the ends of the flock fibers 14. Because the orientation of the fibers, their length, and their degree of penetration in the primary adhesive can be controlled as described hereinabove, a single flocked article can be readily produced in which the secondary adhesive forming the structural body of the three-dimensional formed article can be of a controlled thickness and the fibers 14 can be retained therein in varying degrees of penetration. Such a single flocked article can therefore retain a blend or mixture of different forms of flock fibers and also a mixture of flock fibers of varying length. It has been found that when a given surface of the adhesive has protruding therefrom or embedded therein a mixture of different lengths of flock fibers, the visual and tactile texture is far different from that of an article in which the fibers are all of the same kind and of the same length.

Another method of making the article shown in Figure 7 is illustrated in Figure 8 and comprises first depositing upon the mold form 12 a layer of primary adhesive 10 of predetermined thickness and then depositing upon the primary adhesive a layer of secondary adhesive 16 of predetermined thickness followed by the electrostatic deposition, either spraying or gravity feed, of flock fibers 18 on the secondary adhesive 16. The chemical nature of the secondary adhesive, its viscosity and its tackiness, will, in conjunction with the force of spray or deposition of the flock fibers 18, determine the extent or degree of penetration of the flock fibers in the secondary adhesive. As in the previously described processes, the secondary adhesive may be properly cured and set and the primary adhesive removed either mechanically or by solvents to produce the end product as shown in Figure 7.

A double flocked article of exceptional strength can be produced by another modification of the present process and will be described in connection with Figures 9 and 10. A layer of primary adhesive 10 is deposited upon the mold form 12 by the various methods previously described and relatively long flock fibers 14 are electrostatically deposited upon the primary adhesive so that a portion of the fibers become embedded in the adhesive and extend substantially perpendicularly thereof. A layer of secondary adhesive 16 is sprayed on the fibers transverse the longitudinal axes of the fibers in such a manner that the secondary adhesive does not completely cover or embed the fibers but, rather, permits a predetermined length of the fibers, as at 20, to protrude from the face of the secondary adhesive opposite to the face which contacts the primary adhesive 10. The secondary adhesive is then cured and set, the mold form discharged and article stripped therefrom, and the primary adhesive 10 is removed from the fibers and the secondary adhesive by mechanical stripping or solvent action to produce the article shown in Figure 10 wherein the fibers extend through the entire thickness of the layer of adhesive and protrude from the inner surface 22 and outer surface 24 of the adhesive substantially perpendicularly thereof. It is manifest that such an article will be quite strong and durable and the possibility of pulling out or dislodging the fibers will be quite small.

The above-described article can be made in several other ways. Thus, for example, the secondary adhesive 16 may be deposited upon the free ends of the elongated flock fibers 14 in such a manner that the secondary adhesive completely covers and embeds the fibers. A predetermined thickness of one surface of the secondary adhesive may be removed with a solvent therefor to expose a predetermined length of fibers, as at 20. Thereafter, the secondary adhesive is cured, the article is stripped from the mold form, and the primary adhesive is removed from the secondary adhesive and the fibers to produce the article as shown in Figure 10.

The above described methods of making flocked articles permit the operator a wide latitude in the choice of secondary adhesives and also gives the operator good controls for varying the thickness of the secondary adhesive. At certain times because of the thickness of the adhesive and the chemical nature thereof, elongation and flexing of the secondary adhesive will set up stresses and strains therein to weaken the adhesive. To overcome this disadvantage, the above processes may be varied in such a manner that the secondary adhesive becomes, in effect, a laminated structure. Thus, after stage three as illustrated in Figure 4, a third layer of adhesive 26 of predetermined thickness may be deposited upon the free surface of the secondary adhesive 16 and then another layer of secondary adhesive 16 may be deposited upon the free surface of the third adhesive 26. Thereafter, the further flock fibers 18 may be sprayed upon or deposited by gravity upon the exposed surface of the second layer of secondary adhesive 16. Thereafter, the secondary and third adhesives are cured and set, the article stripped from the mold form, and the primary adhesive removed to produce the article as shown clearly in Figure 11. The third adhesive is chosen to have a lower coefficient of expansion than the secondary adhesive so that the stresses and strains on the secondary adhesive resulting from elongation and flexing will be materially reduced. Note should be taken of the fact that even this article has inner and outer layers of flock protruding in oriented form from an adhesive which is of laminated structure. It is evident that the third or intermediate layer of adhesive 26 constitutes a reinforcement for the secondary adhesive, but it will be seen that this reinforcement is not in the form of a textile material or other backing but simply another predetermined layer of adhesive having a lower coefficient of expansion than the outer layers of adhesive.

It is commercially desirable that certain articles be fabricated from natural or synthetic rubber or latices, as, for example, gloves, work clothes, girdles, bathing suits, boots, etc. It is well known in the art that it is difficult to securely retain natural and synthetic flock fibers in rubber adhesives because the bond between the fibers and the rubber is quite weak. The present method may be varied and adapted to produce flocked rubber articles wherein the fibers are held securely in the rubber or latex adhesive and overcome the above-mentioned disadvantage. A rubber or latex coagulant such as magnesium carbonate and other compounds well known in the art are formulated with and mixed into a compatible primary adhesive. A layer of primary adhesive and coagulant is deposited on the mold form in a manner described hereinabove. Relatively long fibers are electrostatically deposited upon the layer of primary adhesive in which has been incorporated a coagulant. The fibers are embedded in the primary adhesive and coagulant and oriented substantially perpendicularly thereto. As an alternate method, the coagulant may be sprayed or dipped onto the primary adhesive which may be previously deposited upon the mold form, and then flocked in the electrostatic field. Thereafter the mold form, with the flock fibers embedded in the primary adhesive and coagulant thereon, is dipped into a latex dispersion comprising relatively small solid particles, and left there for a predetermined length of time in order that the particles may build up and yet leave a predetermined portion of the free ends of the fibers protruding from the rubber or latex. The rubber or latex particles cohere upon contacting the coagulant and deposit and build up solid particles upon the surfaces of the coagulant and between the fibers. To increase the adhesive bond between the rubber or latex layer and the fibers, additional adhesives may be included in the latex dispersion, said adhesives being compatible. Adhesives containing polyvinyl butyral or casein have been found effective. After the rubber or latex layer has been cured, the article is stripped from the mold form and the primary adhesive removed so that the article resembling that shown in Figure 10 is produced wherein the material supporting the fibers will be a rubber or latex. When relatively thin layers of rubber or latex are desired, it may be desirable to use the surface of the primary adhesive which protrudes between the oriented flock as a coagulant, the adhesive catching and holding the solid latex particles that come in contact with it, and subsequent particles cohering thereon. It is conceivable that this coagulation process may be employed to advantage with plastics other than rubber or latex.

The details of the conditions necessary for carrying out the above-described processes will be set forth immediately hereinafter. As mentioned earlier, various combinations of lengths, colors, and kinds of fibers may be employed in the present process, the only limitation on the combinations being that the length, denier, and kind of fibers be such that they can be properly oriented in an electrostatic field relative to the adhesive layers upon which the fibers are to be supported. The fibers may be of natural origin, such as silk, ramie, cotton, wool, hair, and other types of fibers, or they may be synthetic, as viscose and acetate rayon, nylon, orlon, vinyl fibers, and the like. It should be remembered that there is a marked difference between the flocked surface containing fibers of the same denier oriented substantially perpendicularly to the adhesive surface when the length of the fibers is varied. Thus, for example, a surface containing flock which extends .015 in. from the surface as compared to one which has flock which extends approximately .002 to .010 inch differs markedly in color and feel, the shorter flock surface being softer and more like suede. It has also been found that a combination of the same type of fiber using different lengths may be employed, such as a mixture of approximately 60% .020 inch viscose rayon and 40% of approximately .040 inch viscose rayon, both fibers being of the same denier. The feel and appearance of this pile fabric is entirely different than the fabric employing 100% of either of these fibers. Variation of the 60-40 ratio has been found to produce a softer feeling and softer looking pile.

With regard to the type of electrostatic field employable in the present process, it is conventional to electrostatically deposit flock fibers in a field of alternating current where the fibers travel back and forth. In the present process, the fibers will travel back and forth until they are finally embedded in the adhesive, the charge on the mold form being of such magnitude as to sufficiently hold the fibers on the thin film of primary adhesive. As the art has recognized, direct current may be employed to establish the electrostatic field, and, in such a case, the flock fibers often tend to string out between the electrodes and short out the system. However, since, in certain applications, it is desirable and necessary to spray the adhesives on the mold form through the electrostatic field, to allow the adhesive particles or droplets to jump through the electrostatic field and stay securely on the mold form, it may be desirable to use a direct current electrostatic field. Thus, in the present basic process, it may be desirable, although not entirely necessary, to deposit the first or primary adhesive on the mold form through the direct current electrostatic field, to deposit the first layer of flock on the adhesive through an alternating current electrostatic field, to deposit the secondary adhesive upon the free ends of the fibers through a direct current electrostatic field, and to finally deposit the last layer of flock upon the secondary adhesive through an alternating current electrostatic field.

As is obvious from the above discussion of the present process, the primary and secondary adhesives must differ from each other and, with regard to the form of the invention illustrated in Figure 11, the secondary adhesive must differ from the third or intermediate layer of adhesive. The relationship or difference between the primary and secondary adhesives must be as follows:

1. The primary adhesive must be weaker than the secondary adhesive in bonding characteristics or properties to permit the ready and easy removal of the layer of primary adhesive from both the oriented fibers and the mold form. The secondary adhesive must have strong bonding characteristics, inasmuch as it will be the structural body of the three-dimensional molded article which will securely retain the fibers.

2. Both the primary and secondary adhesives must be capable of properly orienting the fibers.

3. The formulation of the primary adhesive must be such that it does not retain a latent solvent which will blow before the secondary adhesive is cured and set. Such blowing of latent solvent may dislodge some of the fibers and may also upset the orientation thereof.

4. The formulations of the primary and secondary adhesives must be such that there will not be any chemical interaction between them, substantially no miscibility, and substantially no migration of the adhesives.

5. While it is preferred that the primary adhesive be in the form of a strip coat that could be mechanically removed, the present invention also contemplates the use of aqueous and nonaqueous solvents for the removal of the primary adhesive. In the latter case, the formulation of the secondary adhesive should be such that the solvents employed for removing the primary adhesive should have substantially no solubilizing effect upon the secondary adhesive. In this connection, the formulations of the primary and secondary adhesives should be correlated with certain types of fibers which would not unnecessarily absorb and become swelled by the solvents employed for removing the primary adhesive.

The primary adhesives that may be employed to advantage in the present process are as follows:

1. Aqueous solutions of natural gums such as tragancanth, karaya, arabic, etc. adjusted to desired viscosities. The solutions may be modified with wetting agents, non-drying oils, and tackifiers well known in the art. These solutions are generally in the form of a gel which, when heated, changes to a sol and the cold mold form may be dipped in the hot sol, or, the hot sol may be sprayed upon the cold mold form. Such a dipping sets up a gel on the surface of the mold form and the viscosity of the solution and the length of time of dip will determine the thickness of the film deposited as a gel upon the mold form. The concentration and nature of the modifying agents will determine the tackiness of the film. This type of primary adhesive can be removed by hot or cold water, it being understood that a secondary adhesive would be employed therewith which is substantially soluble in hot or cold water.

2. Aqueous gelatine solutions may be employed as the primary adhesive which can be applied to the mold form by a dip or spray technique, the layer of gelatine formed as the primary adhesive being removable either by heat alone or by hot or cold water, the heat or cold water having no melting or solubilizing effect on the secondary adhesive employed.

3. Modified cellulose bases may be employed as the primary adhesive such as carboxymethyl cellulose in water and methyl cellulose in water. The application and removal of this type of adhesive is the same as that described in paragraph one above. An illustrative example of a formulation which can be employed to advantage in the present process follows.

*Example*

| | Grams of 4000 centapoise |
|---|---|
| Methyl cellulose | 25 |
| Triethanolamine | 5 |
| Turkey red oil | 5 |
| Water | 560 |
| Gum tragancanth | 10 |
| Wetting agent (such as Triton) | 5 |

When the above formulation employs carboxymethyl cellulose, hot water is employed to dissolve the adhesive, and when the formulation uses methyl cellulose, water at room temperature may be employed as the solvent.

4. Natural and modified starch base adhesives may be employed as the primary adhesive as well as water dispersible protein adhesives, such as hide, bone, fish glue, casein, albumen, etc. Formulations including alginates, as described in the Patent 2,491,258, may also be employed. When these adhesives are employed, the hot dipped primary adhesive forms a gel and becomes tacky on cooling and does not need the addition of non-drying oils and wetting agents. Hot or cold water may be employed to remove these adhesives.

5. Adhesives may be employed for the primary adhesive formulation which include polyvinyl alcohol which are easily removed from the fibers and the secondary adhesive by hot water.

6. The primary adhesive may be formulated of a coating or an adhesive removable with non-aqueous solvents. For example, coating solutions of acrylate and methacrylate resins form excellent coatings which can be removed by such solvents as ketones, esters, chlorinated hydrocarbons, etc. Cellulose acetate coatings may be employed which are removable in such solvents as ketones and chlorinated hydrocarbons. Ethyl cellulose coating compositions may be employed which are removable by such solvents as alcohols, esters, aromatic hydrocarbons, etc. The vinyl acetate, vinyl butyral, vinyl chloride, and other vinyl resin coatings, except vinyl alcohol, may be employed, which are removable by non-aqueous organic solvents. Reference is made to the publication "Modern Plastics Encyclopaedia," 1947, for the exact formulations of these coatings or adhesives and the exact solvents to be employed for their removal.

7. A strip coating formulation may be employed as the primary adhesive. Conventional plasticized ethyl cellulose strip coatings may be applied as a hot dip to the cold mold form and the fibers deposited upon the adhesive while the coating is still hot. After cooling, the coating may be stripped mechanically from the fibers and the layer of the secondary adhesive. Compositions such as the pressure-sensitive type of adhesive may be employed, as well as the types of adhesives described in the Patent No. 2,222,539. These latter compositions may be used in a tacky semi-dry state, flocked with fibers in such a state, and dried before they are coated with the secondary adhesive.

The secondary adhesives may be thermosetting plastics, thermoplastic plastics, or mixtures thereof, the following being examples of the types of materials which may be employed as secondary adhesives in the present process:

1. Plastisols which are vinyl chloride-acetate resins having a high enough proportion of plasticizer to be the sole dispersing agent so that fluid coatings can be made which have no volatile constituents. The plastisols are converted to a tough, rubbery film by heating to 325–350° F. The physical and chemical properties of the plastisols are described in the publication "Modern Plastics," April 1949, pages 78–80, and in the "Technical Data" booklet entitled "Vinylite Resins Dispersion Coatings," published by the Bakelite Corporation, and copyrighted in 1949. Typical dispersants are esters, ketones, glycol ethers, and aromatic or aliphatic hydrocarbons may be used as diluents if desired. In using the plastisols as the secondary adhesives, it is preferred that they be deposited upon the free ends of the fibers retained in the primary adhesive by a hot or cold dipping process. If extended with the proper diluents, the plastisol may be applied by spraying in or outside of the electrostatic field. As will be manifest, the plastisols can be used as the secondary adhesives in conjunction with the water soluble primary adhesives listed hereinabove, the strip coat primary adhesives, and those primary adhesive coatings which are soluble in a non-aqueous solvent which does not solubilize the plastisol. The viscosity of the plastisols can be readily and easily controlled and, accordingly, the thickness of the film formed on the surface of the primary adhesive can be controlled by a correlation of the viscosity, the temperature of the mold form, and the length of time the mold is left in the plastisol dip.

2. Organosols may be employed as the secondary adhesive and, like the plastisols, are dispersions of vinyl chloride-acetate resins. The finely divided resin particles can be converted into a dispersion merely by pebble milling with a plasticizer in a non-solvent hydrocarbon. The dispersions are true colloidal sols in organic media. To convert the organosol to a usable film, the volatiles are evaporated and the resin particles are fused together with heat, a temperature of 325–350° F. being required to attain a maximum strength film. The organosols are also fully described in the publications hereinabove referred to in connection with the plastisols. The organosols may be combined with all of the primary adhesives listed hereinabove in the same manner as the plastisols, but are less desirable than the plastisols because of the solvent evaporation and disposal problem.

3. Solutions of nylon may be employed as the secondary adhesive in a formulation containing ten to twenty per cent by weight of nylon, five per cent by weight of citric acid, and the remainder ethyl or isopropyl alcohol in water. The ratio of the alcohol to the water is 70 to 30 by volume. When the mold form retaining the primary adhesive and the flock fibers are dipped in this nylon solution, a film will form which can be air dried and fused at temperatures somewhat below 212° F. to insolubilize the nylon. It is evident that such nylon solutions can be employed to advantage in combination with the water soluble primary adhesives hereinabove described.

4. Aqueous solutions of polyvinyl alcohol to which has been added dimethylol urea or chromate salts may be employed as the secondary adhesives which form a film that can be air or force dried in an oven. The films formed are not water soluble and may be disintegrated or dissolved only by certain organic solvents. Therefore, this adhesive coating can be properly combined with the primary adhesives previously set forth.

5. The adhesive coatings requiring non-aqueous solvents described under the primary adhesives hereinabove can, of course, be employed as secondary adhesives when the primary adhesive is of a water soluble formulation. Examples of such adhesive coatings are ethyl cellulose, cellulose acetate, the acrylates, and the vinyls, as well as other adhesives aforementioned or described in Patent No. 2,222,539.

6. Vinyl solution adhesives may be employed in certain applications as secondary adhesives.

With regard to the nature of the third adhesive used to laminate the secondary adhesive, as shown clearly in Figure 11, the only requirement is that the third adhesive have a lower coefficient of expansion than the secondary adhesive to relieve the latter of the shock and stress resulting from elongation and flexing. The third adhesive may be formulated from an organosol modified with a vinylite resin VAGH, a material sold by the Bakelite Corporation which contains by weight approximately 91% vinyl chloride, approximately 3% vinyl acetate, and 2.3% hydroxyl in the form of vinyl alcohol. The third adhesive may also be formed of an organosol modified with polyvinyl butyral or an organosol or plastisol modified with an acrylonitrile adhesive.

Thus, it will be seen that a novel and effective process has been provided for making flocked articles wherein the structural body of the articles is fabricated solely of an adhesive supporting oriented flock fibers which protrude from one or more of the surfaces of the adhesive. The process permits the mass production of the articles and also permits the operator to control the penetrating as well as the protruding lengths of the fibers, the orientation of the fibers, the nature of the adhesives, the blending of different kinds, lengths and deniers of fibers to obtain a variety of tactile and color effects, and so forth.

While a preferred embodiment of the invention has been described and illustrated hereinabove, it should be understood that one skilled in the art may make minor variations in the process without departing from the spirit of the invention and the scope of the appended claims. Thus, for example, the various adhesives, where possible, may be deposited upon the fibers or the mold form as solids followed by the deposition of solvents, diluents, and other liquids which will create an adhesive film in situ on the mold form. Also, the choice of primary adhesives having relatively high solid contents will minimize the problem of solvent absorption by the fibers.

Having described the invention, what is claimed as new is:

1. A process of producing a flocked article comprising depositing a primary adhesive on a mold form, electrostatically depositing and embedding flock fibers in said primary adhesive, depositing a secondary adhesive on the fibers, depositing further flock fibers on the secondary adhesive, stripping the flocked article from the mold form, and removing the primary adhesive.

2. The process of claim 1 wherein the mold form is maintained in an electrostatic field and charged differently from the field, said primary adhesive being deposited on the charged mold form by spraying in the electrostatic field.

3. The process of claim 2 wherein the secondary adhesive is deposited on the fibers by spraying in the electrostatic field.

4. The process of claim 3 wherein the further flock is deposited on the secondary adhesive by spraying in the electrostatic field.

5. The process of claim 1 wherein the primary adhesive is deposited on the mold form by dipping the latter into the primary adhesive.

6. The process of claim 1 wherein the secondary adhesive is deposited on the fibers by dipping the mold form carrying the primary adhesive and fibers in the secondary adhesive.

7. A process of producing a flocked article comprising providing an electrostatic field and a mold form charged differently from the field and movable therethrough, spraying a primary adhesive on the mold form outside the field, moving the mold form through the field and depositing and embedding flock fibers in the primary adhesive in the field, spraying a secondary adhesive on the fibers outside the field, depositing further flock on the secondary adhesive, stripping the article from the mold form, and removing the primary adhesive.

8. The process of claim 7 wherein the further flock is deposited on the secondary adhesive by spraying in the electrostatic field.

9. The process of claim 7 wherein the further flock fibers are deposited on the secondary adhesive by spraying outside the electrostatic field.

10. A process of producing a flocked article comprising depositing a primary adhesive on a mold form, electrostatically depositing and embedding flock fibers in said primary adhesive, depositing a secondary adhesive on the fibers, depositing further flock fibers on the secondary adhesive, stripping the flocked article from the mold form, and removing the primary adhesive by a solvent for the primary adhesive which has substantially no solubilizing effect on the secondary adhesive.

11. The process of claim 10 wherein the solvent is water.

12. A process of producing a flocked article comprising depositing a primary adhesive on a mold form, electrostatically depositing and embedding flock fibers in said primary adhesive, depositing a secondary adhesive on the fibers, depositing further flock fibers on the secondary adhesive, stripping the flocked article from the mold form, and removing the primary adhesive by mechanically stripping off the primary adhesive from the first layer of fibers and the secondary adhesive.

13. A process of producing a flocked article comprising depositing a primary adhesive on a mold form, electrostatically depositing and embedding flock fibers in said primary adhesive, depositing a secondary adhesive on the fibers, depositing further flock fibers on the secondary adhesive, stripping the flocked article from the mold form, and removing the primary adhesive, the primary adhesive having weaker bonding properties than the secondary adhesive so that the primary adhesive is readily and easily removed from the mold form and first layer of fibers.

14. The process of claim 13 wherein the primary adhesive is not chemically reactive and miscible with the secondary adhesive.

15. A process of producing a flocked article comprising depositing a primary adhesive on a mold form, electrostatically depositing and embedding flock fibers in the primary adhesive, depositing a secondary adhesive on the fibers, said secondary adhesive completely covering said fibers and contacting said primary adhesive, removing a layer of predetermined thickness from said secondary adhesive to expose a portion of said fibers, stripping the article from the mold form, and removing the primary adhesive to expose another portion of said fibers.

16. The process of claim 15 wherein the removal of a predetermined thickness from said secondary adhesive is accomplished by the application of a solvent for the secondary adhesive to the surface thereof opposite that surface contacting the primary adhesive.

17. A process of producing a flocked article comprising depositing a layer of primary adhesive on a mold form, electrostatically depositing and embedding flocked fibers in the primary adhesive, depositing a layer of secondary adhesive on the fibers, depositing a layer of a third adhesive on the secondary adhesive, said third adhesive having a lower coefficient of expansion than said secondary adhesive, depositing a further layer of secondary adhesive on the third adhesive, depositing further flock fibers on the further layer of secondary adhesive, stripping the article from the mold form, and removing the primary adhesive.

18. A process of producing a flocked article comprising providing an electrostatic field and a mold form charged differently from the field and movable therethrough, depositing a layer of primary adhesive on the mold form, feeding by gravity through a foraminous member an agitated mass of flock fibers for depositing and embedding the fibers in the primary adhesive, and then depositing a secondary adhesive on the fibers, depositing further flock fibers on the secondary adhesive, stripping the flocked article from the mold form, and removing the primary adhesive.

19. A process of producing a flocked article comprising depositing a primary adhesive on a mold form, electrostatically depositing and embedding flock fibers in said primary adhesive, depositing a secondary adhesive on the fibers, depositing further flock fibers on the secondary adhesive, curing the secondary adhesive, stripping the flocked article from the mold form, and removing the primary adhesive.

20. A process of producing a flocked article comprising dipping a mold form in a primary adhesive, electrostatically depositing and embedding flock fibers in said primary adhesive, dipping said flocked form in a secondary adhesive, depositing further flock fibers on the secondary adhesive, stripping the flocked article from the mold form, and removing the primary adhesive.

21. The process of claim 20 wherein the further flock is deposited on the secondary adhesive by spraying in the electrostatic field.

22. A process of producing a flocked article comprising depositing a layer of primary adhesive on a mold form, electrostatically depositing and embedding flock fibers in the primary adhesive, depositing a layer of secondary adhesive on the fibers, depositing a layer of a third adhesive on the secondary adhesive, said third adhesive having a lower coefficient of expansion than said secondary adhesive, depositing further flock fibers on the third adhesive, stripping the article from the mold form, and removing the primary adhesive.

WALTER R. SAKS.

REFERENCES CITED

The following references are of record in the file of this patent:

UNITED STATES PATENTS

| Number | Name | Date |
| --- | --- | --- |
| 2,222,539 | Meston | Nov. 19, 1940 |
| 2,376,922 | King | May 29, 1945 |
| 2,527,501 | Saks | Oct. 24, 1950 |